Figure 1:
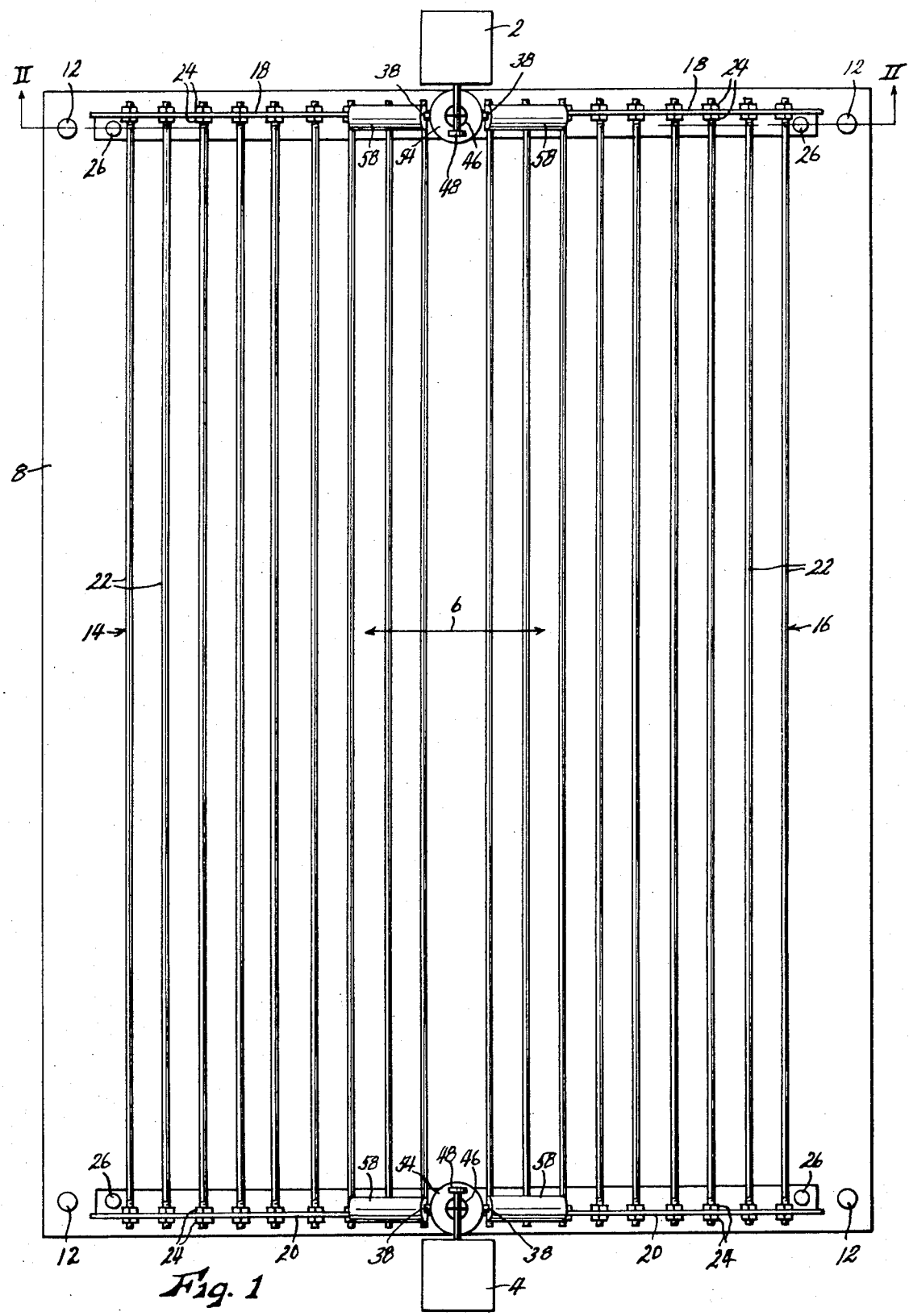

United States Patent [19]
Patterson

[11] 3,744,185
[45] July 10, 1973

[54] CATTLE GATE
[76] Inventor: Richard D. Patterson, Latour, Mo. 64760
[22] Filed: May 10, 1972
[21] Appl. No.: 251,934

[52] U.S. Cl. ................................... 49/131, 49/274
[51] Int. Cl. ............................................ E06b 11/00
[58] Field of Search ...................... 49/131, 132, 133, 49/134, 262, 263, 273, 274

[56] References Cited
UNITED STATES PATENTS

| | | | |
|---|---|---|---|
| 2,024,063 | 12/1935 | Roper | 49/131 |
| 3,516,202 | 6/1970 | Justice | 49/131 |
| 1,479,736 | 1/1924 | Petty | 49/131 X |
| 1,714,820 | 5/1929 | Rounsborg et al. | 49/131 |

Primary Examiner—Dennis L. Taylor
Attorney—John A. Hamilton

[57] ABSTRACT

A cattle gate adapted to obstruct the gate opening of a fence, of such nature that while automotive vehicles may pass freely thereover, cattle and other livestock will not, and consisting of a pair of barred, planar treadle panels disposed in edge-to-edge relation with their adjacent edges aligned with the fence line across the gate opening, and with their remote edges hinged to a ground plate at ground level, and an elevating means yieldably holding the contiguous edges of the panels in an elevated position above the ground plate so that said panels are inclined upwardly toward their contiguous edges, the panels being adapted to be depressed against the ground plate into coplanar relation by the weight of an automotive vehicle passing thereover.

3 Claims, 6 Drawing Figures

CATTLE GATE

This invention relates to new and useful improvements in cattle gates, which are structures disposed in the gate openings of fences designed to permit free travel of automobiles or the like through the openings but to prevent the passage of cattle or other livestock therethrough.

It is well known that cattle will not cross over a surface consisting of parallel bars spaced apart say three or four inches, so long as there is an apparent open space or "pit" several inches deep below said bars. Apparently this is due to an inherent sense of caution in the animals for fear that they could break their legs or otherwise injure themselves if their hooves should pass between the bars. Indeed, this danger is quite real, but the animals appear to sense it without need of experiencing the injury, and refuse to cross such a surface. Cattle gates built on this principle are already common, the bars usually being fixed across the top portion of a shallow, box-like frame, the frame providing the "pit" beneath the bars. However, all prior cattle gates within my knowledge have been subject to certain disadvantages. If the frame or "box" is to be sunk into the ground so that the bars can be disposed conveniently at ground level, this necessitates the digging of a substantial excavation, which of course is a laborious and time-consuming job. If the "box" is rested on the normal ground surface, the bars are then disposed well above the ground level, and inclined approach and exit ramps to the plane of the bars must be built for vehicles passing over the gate. In either case, the pit formed by the box-like frame tends to fill gradually with dirt and the like deposited therein by wind, drainage from rainstorms, and the like. Eventually, the pit will be filled to the level of the bars, and cattle will pass freely thereover, defeating the primary purpose of the gate. Periodic cleaning of the pits, to prevent this occurrence, is also a tedious and time-consuming operation.

The primary object of the present invention, therefore, is the provision of a cattle gate overcoming all of the above enumerated problems encountered in prior gates, in that it does not require either ground excavation nor the construction of vehicle ramps in its installation, and in that it is largely self-cleaning so that the "pit" beneath the bars does not fill with dirt. To this end, the cattle gate contemplated by the present invention consists of a base or ground plate, a pair of barred treadle panels adapted to lie flat on said base plate with their contiguous edges substantially aligned with the fence line and their opposite parallel edges pivoted to said base plate, and means yieldably elevating the contiguous edges of said panels upwardly whereby to create the visual impression of a pit beneath the bars of the panels, said panels being depressed against the base plate by the weight of an automotive vehicle to permit the passage of said vehicle thereover.

Another object is the provision of a cattle gate of the character described having novel means for preventing the binding or immobilization of the pivotal mountings of the treadle panels and their operating elements due to rusting, freezing water, snow and sleet, and the like.

Other objects are simplicity and economy of construction, and efficiency and dependability of operation.

Figure 4:
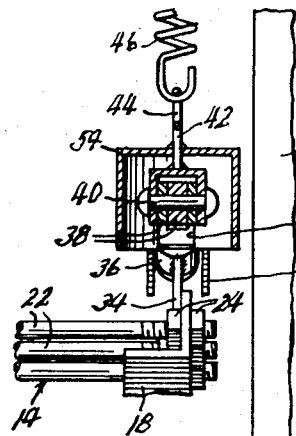
Figure 5:
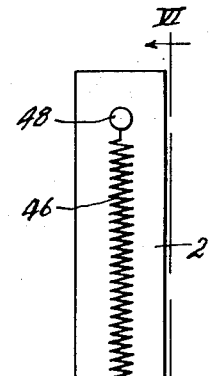
Figure 5:
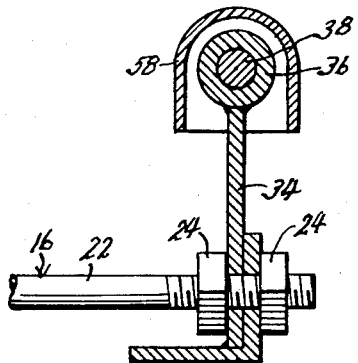
Figure 2:
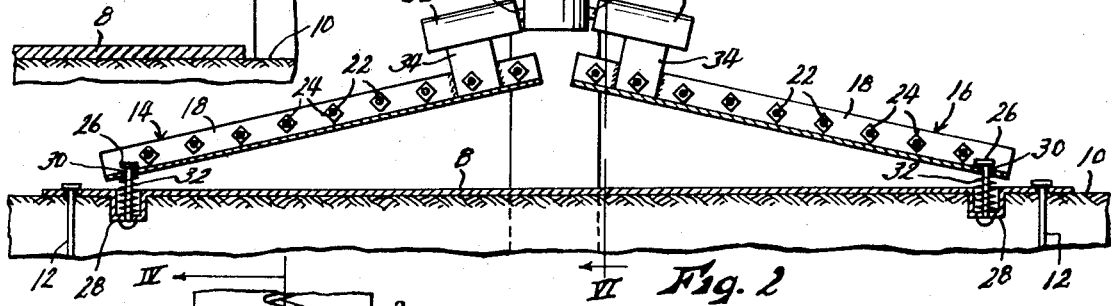
Figure 3:
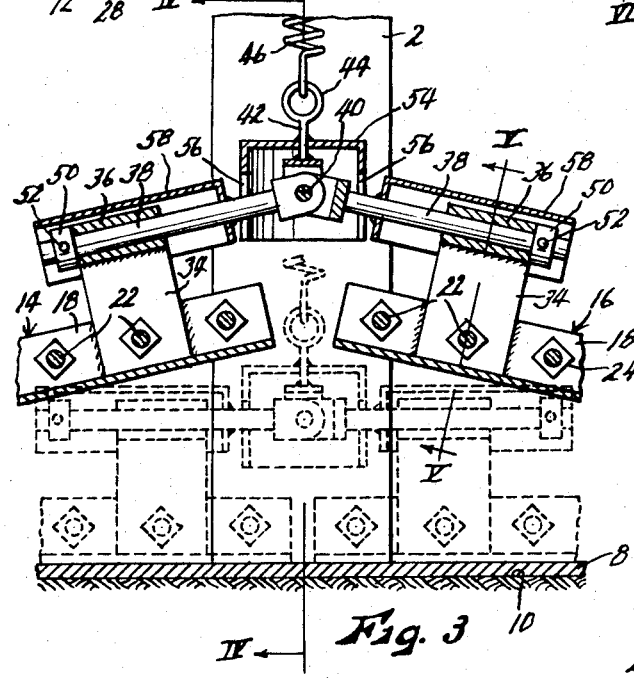
Figure 6:
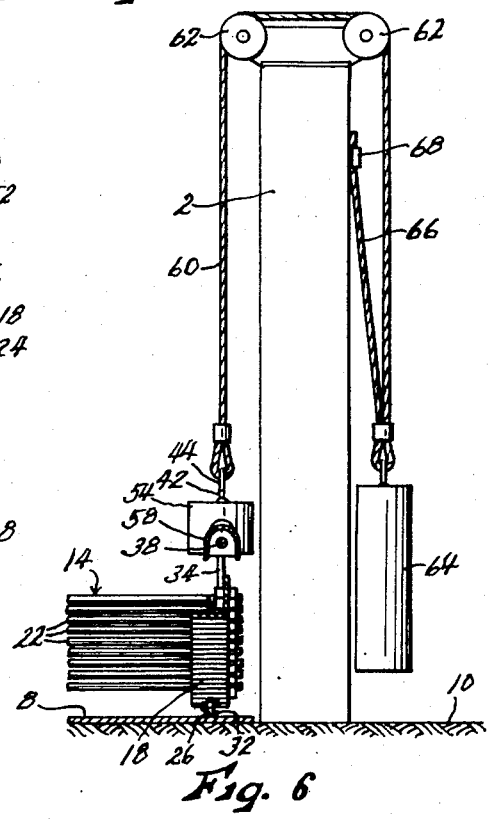

With these objects in view as well as other objects which will appear in the course of the specification, reference will be had to the accompanying drawing, wherein:

FIG. 1 is a top plan view of a cattle gate embodying the present invention, shown operatively installed in a fence gate opening, FIG. 2 is a sectional view taken on line II—II of FIG. 1, with parts left in elevation, FIG. 3 is a detailed, enlarged, fragmentary view showing the lower central portion of FIG. 2, showing the treadle panels in their normal elevated position in solid lines, and in their lowered position in dotted lines, FIG. 4 is a fragmentary sectional view taken on line IV—IV of FIG. 3, with parts left in elevation, FIG. 5 is an enlarged, fragmentary sectional view taken on line V—V of FIG. 3, and FIG. 6 is a fragmentary sectional view taken on line VI—VI of FIG. 2, showing a modification of structure.

Like reference numerals apply to similar parts throughout the several views, and the numerals 2 and 4 apply respectively to a pair of gateposts which are vertical with their lower ends fixed in the ground, and which are disposed at the ends of contiguous sections of a fence, not shown, to define therebetween a gate opening in the fence, through which both animals and vehicles could normally pass in either direction, as indicated by arrow 6 in FIG. 1. The cattle gate embodied in the present invention is disposed within this gate opening, and includes a base or grpund plate 8, which is rectangular and planar, being formed of heavy steel or other suitable material, and adapted to lie flat on the ground 10 within the gate opening. Its width is such as to extend substantially the full distance between gateposts 2 and 4, and its length is such that it extends several feet at both sides of the line of the gate opening. It may be fixed against movement along the ground by stakes 12 inserted through holes at the corners thereof, and driven into the ground, or by any other suitable means.

The gate also includes a pair of generally planar treadle panels indicated generally by the numerals 14 and 16, which are each generally rectangular, and which are disposed over base plate 8 in edge-to-edge relation, with their contiguous edges adjacent the gate line extending between gate posts 2 and 4. As shown, each panel consists of a pair of parallel side rails 18 and 20, which may constitute angle irons, and a series of spaced apart bars 22, which may constitute steel rods or even heavy wire, extending between the side rails at right angles thereto, and affixed to said side rails. As shown, said bars constitute steel rods, and are fixed in the upright flanges of the angle irons forming the side rails by means of lock nuts 24 threaded thereon. If bars 22 were formed of relatively flexible wires, side rails 18 and 20 would preferably be held in rigidly spaced relation by other means, such as by mounting said wires in a complete frame reinforced in any suitable manner. The essential features of these panels are that they be substantially rigid, however this ridigity be produced, and that they present barred surfaces, with the bars thereof spaced apart sufficiently to prevent cattle from venturing thereon so long as there is an apparent pit beneath the bars. A spacing of three or four inches between bars has been found adequate for this purpose, while still permitting automotive vehicles to be driven freely thereover.

The edges of panels 14 and 16 parallel to but distal from their contiguous edges are each pivoted to the upper surface of base plate 8 for vertical movement, whereby their contiguous edges may be elevated. As shown, this hinged connection is provided by a vertical rod 26 adjacent the outer end of each of side rails 18 and 20. Each of said rods is affixed at its lower end at the bottom of a depressed well 28 of base plate 8, and extends upwardly through a loosely fitting hole 30 formed therefor in the associated side rail. Each rod is provided at its upper end, above the side rail, with an enlarged head incapable of passing through hole 30. A helical compression spring 32 is carried on each rod 26, abutting between the associated side rail and the bottom of the associated well 28. Said spring is of sufficient strength to support the portion of the weight of the associated treadle panel imposed thereon, and normally supports the outer end of the associated side rail in slightly elevated relation above base plate 8, as best shown in FIG. 2, but will be compressed within well 28 by the added weight of a vehicle crossing the panels.

Adjacent the inner end of each of side rails 18 and 20, there is affixed an upstanding post 34, to the upper end of which is affixed a tubular guide 36, the axis of which is disposed parallel to the associated side rail. A slide rod 38 is disposed for axial movement in each of guides 36. The slide rods associated with side rails 18 (and those associated with side rails 20 are similarly treated) extend toward each other, and their mating ends are pivoted, as at 40, to the lower end of a rod 42. The upper end of rod 42 forms an eye 44, in which is engaged the lower end of a helical tension spring 46, which is disposed vertically at the inner side of the adjacent gatepost 2 or 4, and the upper end of which is engaged on a pin 48 fixed in said gatepost adjacent the upper end thereof.

Springs 46 bias the inner or contiguous edges of treadle panels 14 and 16 upwardly to the position shown in FIG. 2, the degree of elevation being sufficient to provide open space beneath the panels of enough depth to create the effect of a "pit" therebeneath, so that cattle will not even attempt to move through the gate. Just a few inches of elevation is sufficient for this purpose, and the treadle panels may still be sufficiently level that an automotive vehicle may drive through the gate, its weight pivoting the panels downwardly against springs 46 to allow them to rest directly on base plate 8. As shown in FIGS. 1–5, the upward movement is limited by a pair of collars 50 (see FIG. 3) affixed respectively on the outer ends of the slide rods 38 associated with each of pivots 40, outwardly of tubular guides 36, by means of set screws 52. Said collars arrest the upward movement of the treadle panels by their abutment with the outer ends of guides 36, as shown in FIG. 3, and the degree of elevation may be adjusted by loosening set screws 52 to move said collars along rods 38.

To protect pivots 40 against immobilization by rust, freezing rain or the like, there is affixed to each rod 42 a shield or hood 54 of inverted cup shape, which encloses the associated pivot joint 40, and the skirt of which is notched as at 56 to bridge the associated slide rods 38. Similarly, each slide connection 36–38 is protected against water by a hood member 58 rigidly affixed to the associated slide rod 38.

FIG. 6 shows a modification of structure in which counterweights are substituted for springs 46 as a means for biasing treadle panels 14 and 16 pivotally upwardly. As shown, a cable 60 is attached at one end in the eye 44 of each rod 42, is extended upwardly and trained over pulleys 62 mounted rotatably at the top of the associated gatepost 2 or 4, and is then extended downwardly and attached to a counterweight 64 of suitable mass. A cable 66 attached at its lower end to the counterweight, and at its upper end to the gatepost at 68, limits the downward movement of the cunterweight and hence the upward pivotal movement of treadle panels 14 and 16. In this case the limiting collars 52 as shown in FIG. 3 would not be necessary.

The general operation of the cattle gate as shown has been described in connection with the foregoing description of its construction. That is, with the treadle panels in their elevated position as shown in FIG. 2 and in solid lines in FIG. 3, cattle will refuse to pass thereover due to the apparent "pit" beneath the spaced apart bars 22 of said panels, while the weight of any vehicle will depress the panels to lie flat against base plate 8, thereby permitting free passage of said vehicle, by the extension of springs 46, or the elevation of counterweights 64. Said panels would not block the passage of cattle if they lay flat against the base plate at all times. The panels are of course returned automatically to their elevated cattle-blocking position as soon as the weight of any vehicle passing through the gate is removed from the panels. It is essential, as shown, that the panels 14 and 16 be connected at their contiguous edges as by slide bars 38 and pivot 40, in order that both panels wi'l be depressed by the entry of a vehicle onto either of them. It is preferred that the total width of the two panels, in the direction of arrow 6 in FIG. 1, be greater than the wheelbase dimension of automotive vehicles, so that said panels cannot be elevated between the front and rear wheels of a vehicle, which might cause the inner edges of the panels to interfere with the underportion of the vehicle body.

It will be apparent that the cattle gate shown has several novel advantages. It is simpler to install than previous gates, requiring no ground excavation to form the pit beneath the bars even though the bars are disposed substantially at ground level during the passage of vehicles, such ground-level dispostion of course being most convenient for vehicle passage. Previous gates have required such excavations if the bars were to be disposed at ground level. Some prior gates disposed the bars above the ground to avoid excavations, but this necessitated the construction of vehicle ramps up to the bar level, any necessity for such ramps also being eliminated with the present gate. Furthermore, in such prior art gates disposed above ground level, the "pit" beneath the bars was substantially enclosed at al' sides, that is, by the ramps at its ends and by the bar supports at its sides. Therefore, in the prior art gates the "pit," whether an excavation into the ground or above ground level, tended to fill with washed or blown dirt or other debris, and had to be cleaned out periodically to avoid filling thereof, since when filled to the level of the bars cattle would walk freely thereover. This problem is virtually eliminated with the present gate. The pit space beneath bars 22 is open at all sides thereof, and dirt cannot accumulate therein to any substantial depth before being blown or washed away. Even as to the limited quantity of dirt which might actually accumulate on the upper surface of base plate 8, the present gate is largely "self-cleaning." That is, as the panels 14 and 16 are frequently depressed by vehicles passing thereover, the side rails 18–20 and bars 22 thereof tend to break up and loosen any dirt on the base plate, so that it does not pack firmly, and will itself be removed, or at least kept at a minimum level, by wind and rain.

The present gate of course does involve some relatively movable parts in providing for the pivoting and upward biasing of the treadle panels, and it would be possible that rust, dirt, freezing and the like could interfere with the operation of the gate by inhibiting relative movement of these parts, if means for preventing it were not provided. Hoods 54 and 58 protect pivot joint 40 and the slide connections 36–38 against the entry of dirt and water, and hence against rusting and freezing. The hinge connections of the treadle panels to base plate 8, as provided by rods 26, permits a slight vertical movement of the outer edges of the panels, and they are biased to the top limit of this movement by springs 32. Thus the outer edges of the panels move downwardly and then upwardly on rods 26 each time a vehicle first enters and then leaves the gate. This vertical movement effectively loosens the connection by breaking up any rust, ice, or the like which otherwise might have inhibited free pivotal movement of the panel, and is also effective in preventing the accumulation of dirt or other foreign matter beneath the outer end portions of the side rails of the panels, which also could inhibit free pivoting of the panel.

While I have shown and described specific embodiments of my invention, it will be readily apparent that many minor changes of structure and operation could be made without departing from the spirit of the invention.

What I claim as new and desire to protect by Letters Patent is:

1. A cattle gate comprising:
   a. a base plate adapted to be secured flat on the ground within the gate opening of a fence line, and to extend transversely at both sides of said fence line,
   b. a pair of generally rectangular treadle panels including transversely spaced apart, generally parallel bars, said panels being adapted to lie flat on said base plate in edge-to-edge relation with their contiguous edges lying substantially at said fence line,
   c. means pivoting the edges of said panels parallel with but remote from their contiguous edges to said base plate, for vertical pivotal movement on horizontal axes,
   d. means yieldably biasing the contiguous edges of said panels upwardly from said base plate to a position substantially thereabove, and
   e. means interconnecting said treadle panels at the contiguous edges thereof, whereby depression of either of said panels against said biasing means causes simultaneous depression of the other panel, said interconnecting means comprising a pair of tubular guides affixed respectively to said panels adjacent th contiguous edges thereof, the axes of said guides being generally normal to the pivotal axes of their respective panels, a pair of rods respectively and slidably mounted in said tubular guides and extending toward said fence line, and means pivotally connecting the contiguous ends of said slide rods for relative movement on an axis parallel to the contiguus edges of said panels.

2. A cattle gate as recited in claim 1 with the addition of:
   a. a hood member covering the pivotal connection between said slide rods to prevent the entry of water and dirt into said connection, and
   b. a pair of hood members respectively covering said tubular guides and slide rods to prevent the entry of water and dirt into the sliding connections therebetween.

3. A cattle gate as recited in claim 1 with the addition of a pair of collars fixed respectively on said slide rods, at the sides of said tubular guides opposite from the pivotal connection of said slide rods, whereby to limit the elevation of said treadle panels by said biasing means, said collars being adjustably movable along said slide rods.

* * * * *